United States Patent
Wilhelm et al.

(10) Patent No.: US 8,613,800 B2
(45) Date of Patent: Dec. 24, 2013

(54) PIGMENT PREPARATIONS

(75) Inventors: Volker Wilhelm, Lorsch (DE); Hans Jurgen Brehm, Lindenfels (DE)

(73) Assignee: Merck Patent GmbH, Darmstadt (DE)

(*) Notice: Subject to any disclaimer, the term of this patent is extended or adjusted under 35 U.S.C. 154(b) by 0 days.

(21) Appl. No.: 12/989,100

(22) PCT Filed: Apr. 9, 2009

(86) PCT No.: PCT/EP2009/002681
§ 371 (c)(1), (2), (4) Date: Jan. 3, 2011

(87) PCT Pub. No.: WO2009/129941
PCT Pub. Date: Oct. 29, 2009

(65) Prior Publication Data
US 2011/0088595 A1    Apr. 21, 2011

(30) Foreign Application Priority Data
Apr. 23, 2008 (DE) .......................... 10 2008 020 442

(51) Int. Cl.
*C09C 1/00* (2006.01)
*C09B 67/08* (2006.01)
*C09D 5/03* (2006.01)
*C09D 5/36* (2006.01)
*C09D 7/12* (2006.01)

(52) U.S. Cl.
USPC .................. 106/415; 106/31.61; 106/31.62; 106/31.63; 106/272; 106/417; 430/108.8; 524/275; 524/277

(58) Field of Classification Search
USPC ........ 106/415, 272, 31.61, 31.62, 31.63, 417; 430/108.8; 524/275, 277
See application file for complete search history.

(56) References Cited

U.S. PATENT DOCUMENTS

| | | | |
|---|---|---|---|
| 4,116,628 A | 9/1978 | Hesse et al. | |
| 5,455,288 A * | 10/1995 | Needham | 523/205 |
| 6,451,102 B1 | 9/2002 | Hilder et al. | |
| 2002/0098435 A1 | 7/2002 | Rohr et al. | |
| 2005/0113487 A1 | 5/2005 | Willard et al. | |
| 2005/0143493 A1 * | 6/2005 | Kieser et al. | 523/171 |
| 2006/0223932 A1 | 10/2006 | Kieser et al. | |
| 2010/0179256 A1 * | 7/2010 | Kling et al. | 524/88 |

FOREIGN PATENT DOCUMENTS

| DE | 26 03 211 A1 | 8/1977 |
|---|---|---|
| DE | 10 2005 025 609 A1 | 2/2006 |
| DE | 10 2006 039 913 A1 * | 2/2008 |
| EP | 1 204 005 A2 | 5/2002 |
| WO | WO 2005/019327 A1 | 3/2005 |
| WO | WO 2005/052076 A1 | 6/2005 |

OTHER PUBLICATIONS

Printout of STN Registry No. 6683-19-8, tetrakis [methylene-3-(3,5-di-tert-butyl-4-hydroxyphenylpropionate)]methane (Nov. 1984).*
Irganox® 1010 Phenolic Primary Antioxidant for Processing and Long-Term Thermal Stabilization, MSDS, Ciba Specialty Chemicals (Aug. 1998).*
International Search Report of PCT/EP2009/002681 (Nov. 4, 2009).

* cited by examiner

*Primary Examiner* — Anthony J Green
(74) *Attorney, Agent, or Firm* — Millen, White, Zelano & Branigan, P.C.

(57) ABSTRACT

The present invention relates to pigment preparations comprising one or more effect pigments in platelet form, at least one antioxidant and a wax or wax mixture, and to the use thereof for pigmentation of application media, especially paints, coating materials, powder coating materials, polymers, and for production of masterbatches.

13 Claims, No Drawings

PIGMENT PREPARATIONS

The present invention relates to pigment preparations comprising one or more effect pigments in platelet form, and to the use thereof for pigmentation of application media, especially paints, coating materials, powder coating materials, polymers, and for production of masterbatches.

The flow behaviour of pigments based on substrates in platelet form, for example mica platelets, is frequently unsatisfactory. In a multitude of applications, especially in the printing and paints sector, this does not lead to any major problems. However, in the case of incorporation into polymers, the poor flow behaviour of these pigments is found to be problematic.

Furthermore, the processing of pearlescent pigments, for example the production of masterbatches, results in marked evolution of dust, which requires a considerable level of apparatus complexity to eliminate the dust and to clean the machines.

It is known per se that pigments can be coated with organic components in order to facilitate the incorporation of the pigments, for example, into polymers, powder coating materials, toners, etc. Such processes are, for example, known from DE 26 03 211, WO 2005/052076, WO 2005/019327, U.S. 2002/0098495 A1 and DE 4317019.

For example, U.S. Pat. No. 6,451,102 proposes a process for embedding pearlescent pigments into a wax in order to increase the flow behaviour and especially the bulk density of the effect pigments in platelet form.

However, it has been found that the prior art pigment preparations comprising (>50%) an effect pigment and an organic polymer or wax are frequently not oxidization-stable and tend to dangerous self-heating, even though such preparations are not classified as highly flammable solids (according to test method A.10. Flammability (of Solids) of the Official Journal of the European Union No. L 383 A/76 dated 29 Dec. 1992).

It is therefore an object of the present invention to provide pigment preparations which can be incorporated very efficiently into application media and at the same time do not show any tendency to dangerous self-heating.

It has now been found that, surprisingly, pigment preparations comprising effect pigments and a wax are stable with respect to dangerous self-heating when an antioxidant is added to them.

The present invention provides a pigment preparation which comprises one or more effect pigments in platelet form, a wax or a wax mixture and at least one antioxidant. The effect pigment is preferably adhesive-bonded or partly or fully coated on the surface with the wax or wax mixture and at least one antioxidant.

Such pigment preparations exhibit a significantly reduced tendency to self-ignition and, owing to their good flow properties and the high bulk density, are especially suitable for pigmentation of polymers, and in the production of masterbatches.

The present invention further provides a process for production of the inventive pigment preparation, wherein one or more effect pigments in platelet form and at least one antioxidant are mixed with a wax or wax mixture under the influence of heat.

The inventive pigment preparation is found to be particularly advantageous for incorporation into polymers. Furthermore, the inventive pigment preparations are non-dusting and have very good free flow, which reduces the apparatus complexity in the processing thereof. In addition, when the inventive pigment preparations are used in a twin-screw extruder, the throughput, according to the conditions, can be increased at least by a factor of 2-5 compared to the unprepared pigment. Furthermore, using the inventive pigment preparations in a single-screw extruder, it is possible to produce masterbatches with an effect pigment content of up to 50% by weight, based on the masterbatch.

An essential constituent of the inventive pigment preparation is, as well as the antioxidant, the wax or wax mixture.

In this application, the wax is defined as follows: at 20° C., kneadable, solid to brittle and hard, coarse to finely crystalline, translucent to opaque, but not glasslike; above 40° C., melting without decomposition, comparatively low-viscosity and non-stringing even a little above the melting point, strongly temperature-dependent consistency and solubility, polishable under gentle pressure. Waxes differ from similar synthetic or natural products (e.g. resins, plastic materials, metal soaps, etc.) principally in that they are converted to the molten, low-viscosity state generally between 50 and 90° C., in exceptional cases even up to 200° C., and are virtually free of ash-forming compounds. Waxes form pastes or gels and generally burn with a sooty flame.

The waxes used are preferably natural waxes, such as plant waxes, e.g. carnauba wax, candelilla wax, and animal waxes, e.g. beeswax, modified natural waxes, for example paraffin waxes, microwaxes, partly synthetic waxes, for example montan ester waxes, or fully synthetic waxes, such as polyolefin waxes, e.g. polyethylene and polypropylene waxes, polyethylene glycol waxes, cycloolefin polymer waxes, amide waxes, for example N,N'-distearylethylenediamine, zirconocene waxes, and chlorinated or fluorinated polyolefin waxes or polyethylene-polytetrafluoroethylene wax mixtures.

Particular preference is given to polyolefin waxes, and to polyolefin waxes which contain polar groups and are formed by subsequent oxidation of the polyolefin wax, by grafting reaction with monomers containing carboxylic acid, carboxylic ester, carboxylic anhydride or hydroxyl groups, or by copolymerization from an olefin and a monomer containing carboxylic acid, carboxylic ester, carboxylic anhydride or hydroxyl groups.

Waxes in the context of the present invention may also be higher molecular weight compounds which have a waxy character and have preferably been prepared by polycondensation, polyaddition or polymerization processes, for example thermoplastic polyester-, epoxide-, styrene-acrylate copolymer, styrene-butadiene copolymer, cycloolefin copolymer resins. In order to possess sufficient solubility in organic solvents at elevated temperature, preferred waxes have molecular weights of 500-20 000, especially of 1000-15 000 and most preferably of 2000-10 000.

The melting range of the waxes (determined to DIN 51007) is preferably within the range of 70-200° C., especially of 80-150° C. and most preferably of 90-130° C.

Very particularly preferred waxes are those which have good compatibility with a masterbatch into which the pigment is introduced. For introduction into polyolefin masterbatches, polyolefin waxes are preferred, e.g. polyethylene or polypropylene waxes.

Preferred waxes or wax mixtures have a melting range of 70-200° C., especially of 90-130° C.

Particularly preferred waxes are polyolefin waxes, especially polyethylene wax. Further preferred are montan ester waxes and derivatives thereof, and amide waxes.

The proportion of wax or wax mixture in the inventive pigment preparation is preferably 5-50% by weight, especially 20-40% by weight, most preferably 25-35% by weight, based on the total mass of the preparation.

According to the field of use of the inventive pigment preparation, the amount and the type of the wax may vary, in particular in order to ensure compatibility with the application medium. Of course, the inventive pigment preparation may also contain a mixture of one, two, three or more different waxes in order to fulfil a particular profile of properties. The inventive pigment preparation, however, preferably contains only one wax, especially a polyolefin wax, most preferably a polyethylene wax.

In the inventive pigment preparation, the effect pigments, the antioxidant and the wax are preferably present mixed with one another. The effect pigment is preferably at least partially or completely coated, i.e. completely enveloped, by the wax. A complete envelope and "adhesive bonding" of the effect pigment in platelet form to the wax comprising the antioxidant is very particularly preferred.

The effect pigments in platelet form are preferably pearlescent pigments, interference pigments, metal effect pigments, multilayer pigments with transparent, semitransparent and/or opaque layers, holographic pigments, BiOCl pigments and/or LCP pigments.

Pearlescent pigments, interference pigments, metal effect pigments or multilayer pigments with transparent, semitransparent and/or opaque layers usable in accordance with the present invention are based especially on carriers, which are preferably in platelet form. Suitable examples are $TiO_2$ platelets, synthetic (e.g. fluorophlogopite) or natural mica, doped or undoped glass platelets, metal platelets, $SiO_2$ platelets, $Al_2O_3$ or iron oxide platelets. The metal platelets may consist, among other substances, of aluminium, titanium, bronze, steel or silver, preferably aluminium and/or titanium. The metal platelets may be passivated by appropriate treatment. The glass platelets may consist of all glass types known to those skilled in the art, for example of A glass, E glass, C glass, ECR glass, used glass, window glass, borosilicate glass, Duran® glass, laboratory glass or optical glass. The refractive index of the glass platelets is preferably 1.45-1.80, especially 1.50-1.70. The glass substrates preferably consist of C glass, ECR glass or borosilicate glass.

In a preferred embodiment, the carrier may be coated with one or more transparent, semitransparent and/or opaque layers, comprising metal oxides, metal oxide hydrates, metal suboxides, metals, metal fluorides, metal nitrides, metal oxynitrides or mixtures of these materials. The metal oxide, metal oxide hydrate, metal suboxide, metal, metal fluoride, metal nitride, metal oxynitride layers or the mixtures thereof may be low-index (refractive index <1.8) or high-index (refractive index ≥1.8). Suitable metal oxides and metal oxide hydrates are all metal oxides or metal oxide hydrates known to those skilled in the art, for example aluminium oxide, aluminium oxide hydrate, silicon oxide, silicon oxide hydrate, iron oxide, tin oxide, cerium oxide, zinc oxide, zirconium oxide, chromium oxide, titanium oxide, especially titanium dioxide, titanium oxide hydrate and mixtures thereof, for example ilmenite or pseudobrookite. The metal suboxides used may, for example, be the titanium suboxides. Suitable metals are, for example, chromium, aluminium, nickel, silver, gold, titanium, copper or alloys; a suitable example of a metal fluoride is magnesium fluoride. The metal nitrides or metal oxynitrides used may, for example, be the nitrides or oxynitrides of the metals titanium, zirconium and/or tantalum. Preferably metal oxide, metal, metal fluoride and/or metal oxide hydrate layers and most preferably metal oxide and/or metal oxide hydrate layers are applied to the carrier. In addition, it is also possible for multilayer structures composed of high- and low-index metal oxide, metal oxide hydrate, metal or metal fluoride layers to be present, in which case high- and low-index layers preferably alternate. Especially preferred are layer assemblies of a high-index layer and of a low-index layer, in which case one or more of these layer assemblies may be applied to the carrier. The sequence of high- and low-index layers may be matched to the carrier, in order to include the carrier in the multilayer structure. In a further embodiment, the metal oxide, metal oxide hydrate, metal suboxide, metal, metal fluoride, metal nitride, metal oxynitride layers may be admixed or doped with colorants or other elements. Suitable colorants or other elements are, for example, organic or inorganic colour pigments such as coloured metal oxides, e.g. magnetite, chromium oxide, or colour pigments, for example Prussian blue, ultramarine, bismuth vanadate, Thenard's blue, or else organic colour pigments, for example indigo, azo pigments, phthalocyanines, or else carmine red, or elements, for example yttrium or antimony. Effect pigments containing these layers exhibit high colour variety in relation to their mass tone and may in many cases exhibit an angle-dependent change in colour (colour flop) as a result of interference.

In a preferred embodiment, the outer layer on the carrier is a high-index metal oxide. This outer layer may be additional on top of the abovementioned layer assemblies or, in the case of high-index carriers, be part of a layer assembly and may consist, for example, of $TiO_2$, titanium suboxides, $Fe_2O_3$, $SnO_2$, $ZnO$, $ZrO_2$, $Ce_2O_3$, $CoO$, $Co_3O_4$, $V_2O_5$, $Cr_2O_3$ and/or mixtures thereof, for example ilmenite or pseudobrookite. $TiO_2$ is particularly preferred, as is $Fe_2O_3$. When the carrier platelets are coated with $TiO_2$, the $TiO_2$ is preferably present in the rutile polymorph, or else in the anatase polymorph. Particularly preferred effect pigments have the following structure:

substrate platelets+$TiO_2$ (rutile)
substrate platelets+$TiO_2$ (rutile)+$Fe_2O_3$
substrate platelets+$Fe_2O_3$
substrate platelets+$Fe_3O_4$
substrate platelets+$SiO_2$+$TiO_2$ (rutile)
substrate platelets+$TiO_2$ (rutile)+$SiO_2$+$TiO_2$ (rutile)
substrate platelets+$TiO_2$ (anatase)+$SiO_2$+$TiO_2$ (anatase).

In this patent application, "high-index" means a refractive index of ≥1.8, whereas "low-index" means a refractive index of <1.8.

The thickness of the metal oxide, metal oxide hydrate, metal suboxide, metal, metal fluoride, metal nitride, metal oxynitride layers or of a mixture thereof is typically 3 to 300 nm and, in the case of the metal oxide, metal oxide hydrate, metal suboxide, metal fluoride, metal nitride, metal oxynitride layers or of a mixture thereof preferably 20 to 200 nm. The thickness of the metal layers is preferably 4 to 50 nm.

The size of the carriers and hence of the effect pigments is not critical per se. Carrier platelets and/or carrier platelets coated with one or more transparent or semitransparent metal oxide, metal or metal fluoride layers generally have a thickness between 0.05 and 5 µm, especially between 0.1 and 4.5 µm. The length or width is typically between 1 and 250 µm, preferably between 2 and 200 µm and especially between 2 and 100 µm.

Particularly preferred effect pigments have the following layer structure:
mica platelets+$TiO_2$
mica platelets+$TiO_2$+$Fe_2O_3$
mica platelets+$TiO_2$/$Fe_2O_3$
mica platelets+$Fe_2O_3$
mica platelets+$Fe_3O_4$
mica platelets+titanium oxynitrides
mica platelets+$TiO_2$+$SiO_2$+$TiO_2$
mica platelets+$TiO_2$/$Fe_2O_3$ mica platelets+$TiO_2$/$Fe_2O_3$+$SiO_2$+$TiO_2$
mica platelets+$TiO_2$/$Fe_2O_3$+$SiO_2$+$TiO_2$/$Fe_2O_3$
mica platelets+$TiO_2$+$SiO_2$+$TiO_2$/$Fe_2O_3$
$Al_2O_3$ platelets+$TiO_2$
$Al_2O_3$ platelets+$Fe_2O_3$
$Al_2O_3$ platelets+titanium oxynitrides
$SiO_2$ platelets+$TiO_2$
$SiO_2$ platelets+$Fe_2O_3$
$SiO_2$ platelets+titanium oxynitrides
glass platelets+$TiO_2$
glass platelets+$Fe_2O_3$
glass platelets+$TiO_2$+$Fe_2O_3$
glass platelets+$SiO_2$+$TiO_2$
glass platelets+$SiO_2$+$Fe_2O_3$
glass platelets+$SiO_2$+$TiO_2$+$Fe_2O_3$
glass platelets+$SiO_2$+$TiO_2$+$SiO_2$
glass platelets+$TiO_2$+$SiO_2$+$TiO_2$
glass platelets+$SiO_2$+$TiO_2$+$SiO_2$+$TiO_2$
glass platelets+titanium oxynitrides
$Fe_2O_3$ platelets+$TiO_2$
$Fe_2O_3$ platelets+$Fe_2O_3$
$Fe_2O_3$ platelets+titanium oxynitrides
metal platelets (optionally passivated)+$TiO_2$
metal platelets (optionally passivated)+$Fe_2O_3$.

$TiO_2$/$Fe_2O_3$ means that $TiO_2$ and $Fe_2O_3$ are present in a layer as a mixture and/or as a mixed oxide in the form of pseudobrookite ($TiFe_2O_5$).

Suitable effect pigments are commercially available, for example from BASF Catalysts (formerly Engelhard Corporation), for example under the brand names Firemist®, Rightfit™, Magnapearl®, from Merck KGaA under the brand names Iriodin®, Miraval®, Xirallic®, Pyrisma® and Colorstream®.

To additionally increase the light, water and weathering stability of the pigments, it is frequently advisable, depending on the field of use, to subject the effect pigment to aftercoating or after-treatment. Useful after-coatings or after-treatments include the processes described, for example, in DE-C 22 15 191, DE-A 31 51 354, DE-A 32 35 017 or DE-A 33 34 598. This after-coating further increases the chemical stability or facilitates the handling of the pigment, especially the processing into different media. To improve the wettability, dispersibility and/or compatibility with the application media, it is possible to apply functional coatings of $Al_2O_3$ or $ZrO_2$ or mixtures or mixed phases thereof to the pigment surface. Additionally possible are organic or organic/inorganic combination after-coatings, for example with silanes, as described, for example, in EP 0090259, EP 0 634 459, WO 99/57204, WO 96/32446, WO 99/57204, U.S. Pat. No. 5,759, 255, U.S. Pat. No. 5,571,851, WO 01/92425 or in J. J. Ponjeé, Philips Technical Review, Vol. 44, No. 3, 81 ff. and P. H. Harding J. C. Berg, J. Adhesion Sci. Technol. Vol. 11 No. 4, p. 471-493.

The proportion of the effect pigments in platelet form in the inventive pigment preparation is generally between 55 and 80% by weight, preferably between 65 and 75% by weight, based on the pigment preparation. The optimal proportions can be determined easily by the person skilled in the art and depend essentially on the particle size of the effect pigments used, the form factor of the effect pigments and the type of pigment structure.

Particularly preferred inventive pigment preparations comprise 55-80% by weight, preferably 65-75% by weight, of effect pigment
20-45% by weight, preferably 25-35% by weight, of wax or wax mixture
0.03-1.5% by weight, preferably 0.03-0.8% by weight, of antioxidant
and optionally
up to 10% by weight of customary polymer and/or coating materials sector additives, assistants, fillers, dyes and/or colour pigments, based on the overall preparation,
where the total content of all components is 100% by weight.

What is desirable is a maximum proportion of effect pigments or a minimum proportion of carrier material, in order to introduce a minimum amount of extraneous material in the application medium to be pigmented, for example a polymer. However, sufficient carrier material has to be used in order to ensure the desired properties of the inventive pigments preparation, for example non-dusting, improved free flow or higher throughput in masterbatch production. To this end, the particles not only have to be enveloped by the carrier material but also have to be adhesive-bonded to one another to give a coarse "powder" with good free flow.

The dangerous self-heating of pigment preparations comprising a wax and an effect pigment is reduced by the addition of an antioxidant, such that classification as a hazardous material according to examination method N.4 described in chapter 33.3.1.6 of the Recommendations on the Transport of Dangerous Goods, Manual of Tests and Criteria is no longer required.

All antioxidants known to those skilled in the art are suitable for the present invention, provided that they are compatible with the wax. The antioxidants hinder or prevent the thermally induced oxidation of the waxes in the application medium, for example in coating materials and polymers. They prevent the formation of free radicals which would be formed by heating in the presence of oxygen and simultaneously prevent discoloration and/or alteration of the mechanical properties of the application media, for example polymers, coating materials.

Preferred antioxidants are selected from the group of the
lactone/phosphite mixtures
lactone/phosphite/phenol mixtures
phenol/phosphite mixtures
phosphites
phenols.

Particularly preferred antioxidants are selected from the group of
tetrakis[methylene-3-(3,5-di-tert-butyl-4-hydroxy-phenyl-propionate)]methane
n-octadecyl β-(4-hydroxy-3,5-di-tert-butylphenyl)-propionate
N,N'-bis(3,5-dibutyl-4-hydroxyphenylpropionyl)-hydrazine
N,N'-hexane-1,6-diylbis[3-(3,5-di-tert-butyl-4-hydroxyphenyl)propionamide]
tris(3,5-di-tert-butyl-4-hydroxybenzyl)isocyanurate
tri(2,4-di-tert-butylphenyl)phosphite
bis(2,4-di-t-butylphenyl)pentaerythritol diphosphite
triphenyl phosphite
trisnonylphenyl phosphite
diphenyl isodecyl phosphite
diisodecyl phenyl phosphate
diisooctyl phenyl phosphite
diphenyl isooctyl phosphate
phosphoric acid alkyl/aryl esters
bisphenol A phosphite
dilauryl thiodipropionate
distearyl thiodipropionate
butyl- and octyldiphenylamine
dinonyldiphenylamine
4,4'-bis(alpha,alpha-dimethylbenzyl)diphenylamine
4,4'-dioctyldiphenylamine mixture of tetrakis[methylene-3-(3,5-di-tert-butyl-4-hydroxyphenylpropionate)]methane and tri(2,4-di-tert-butylphenyl)phosphite (weight ratio 1:1)

mixture of tetrakis[methylene-3-(3,5-di-tert-butyl-4-hydroxyphenylpropionate)]methane and tri(2,4-di-tert-butylphenyl)phosphite (weight ratio 1:2)

mixture of tetrakis[methylene-3-(3,5-di-tert-butyl-4-hydroxyphenylpropionate)]methane and tri(2,4-di-tert-butylphenyl)phosphite (weight ratio 1:3)

mixture of tetrakis[methylene-3-(3,5-di-tert-butyl-4-hydroxyphenylpropionate)]methane and tri(2,4-di-tert-butylphenyl)phosphite (weight ratio 1:4)

mixture of n-octadecyl β-(4-hydroxy-3,5-di-tert-butylphenyl)propionate and tri(2,4-di-tert-butylphenyl)phosphite (weight ratio 1:1).

Antioxidants with this chemical composition are commercially available, for example from Ciba Specialty Chemicals:

IRGANOX® 1010, IRGANOX® 1076, IRGANOX® 245: phenols

IRGANOX® B 225: phenol/phosphite mixture

IRGANOX® XP 620: phenol/phosphite/phenol mixture

IRGAFOS® 168, IRGAFOS® 126: phosphites

IRGAFOS® XP 60: lactone/phosphite mixture, or, for example, from Clariant:

Hostanox O10 (phenolic antioxidant: tetrakismethylene-(3,5-di-tert-butyl-4-hydroxyphenyl/hydrocinnamate).

The inventive pigment preparation contains preferably 0.01-5% by weight, especially 0.1-2% by weight, most preferably 0.1-1.0% by weight, of antioxidant based on the wax used.

In a further embodiment, the inventive pigment preparation may comprise further additives and/or assistants, as are customary for use in application media from the fields of paints, coating materials, powder coating materials, polymers. Such additives and/or assistants may be lubricants, release agents, stabilizers, antistats, flame retardants, dyes, flexibilizers and plasticizers, adhesion promoters, blowing agents, antioxidants, UV absorbers, inorganic fillers, organic polymer-compatible solvents and/or surfactants, for example diisooctyl phthalate, phenol derivatives, mineral oils. An overview of the usable additives and assistants can be found in Saechtling, Kunststoff Taschenbuch [Plastics Handbook], 27th Edition, Carl Hanser Verlag, or is given by R. Wolf in "Plastics, Additives" in Ullmann's, Encyclopedia of Industrial Chemistry, Internet edition, 7th Edition, 2003.

The inventive pigment preparation is relatively easy to produce. The present invention thus also provides a process for producing the inventive pigment preparation, wherein one or more effect pigments in platelet form are mixed with a wax or a wax mixture and an antioxidant under the influence of heat.

For example, in the process according to the invention, it is possible to initially charge the effect pigment and mix it with the wax or the solution (or aqueous emulsions or dispersions) of the wax and the antioxidant. If the wax or wax mixture is added in the form of a solution, it is also possible to disperse the effect pigment and the antioxidant in this solution and to evaporate off the solvent. The solvent is selected in a manner obvious to the person skilled in the art taking account of the solubilities of the pigments used and especially of the wax used. The precipitation of the carrier material from an aqueous emulsion or dispersion by means of pH alteration is likewise possible. Furthermore, the pigment preparation can be produced by melting the wax. The melting of the wax is particularly preferred in the present invention, because this allows the use of solvents to be avoided.

The production of the inventive pigment preparation by melting is effected preferably at temperatures of 70 to 250° C. Preference is given to effecting the process at temperatures above the melting range of the wax. In this way, particularly good mixing of pigment, antioxidant and wax is achieved.

In a further embodiment of the process according to the invention, further additives and/or assistants customary in the processing of coating materials and polymers can be added to the mixture of effect pigment in platelet form, antioxidant and carrier material. Examples of such additives and/or assistants have already been mentioned in the description of the pigment preparation.

After removal of the solvent or after cooling of the wax applied in the course of melting, the pigment preparation is present as a free-flowing, coarse powder which can be processed further efficiently.

The effect pigments treated in this way are in no way inferior to the pure untreated effect pigments in terms of their lustre. This is all the more surprising in that the pigments can be processed into the wax in relatively large amounts. For instance, the proportion of wax in the pigment preparation may be <50% by weight, preferably 25-35% by weight, without any impaired lustre being noted after processing.

The bulk density of the inventive pigment preparation is at least 50% higher than the bulk density of the pure (untreated) effect pigment.

In this application, the bulk density is understood to mean the ratio of weight/volume of a loose bed.

The use of the inventive pigment preparation for direct pigmentation of polymers and coating materials and for production of masterbatches likewise forms part of the subject-matter of the present invention.

The direct incorporation of the inventive pigment preparation into the polymer is effected by mixing the polymer granule and/or powder with the pigment preparation. Subsequently, the polymer pigmented with the inventive pigment preparation is shaped under the action of heat. In addition, further additives and pigments can optionally be added to the polymer granule and/or powder in the course of incorporation of the pigment preparation. Examples of such additives have been mentioned above in the description of the pigment preparation. Suitable pigments are all inorganic or organic pigments known to those skilled in the art.

The polymer granule and/or powder/pigment mixture is generally produced by initially charging the polymer granule and/or powder in a suitable mixer, for example a tumbling or rapid mixer, wetting it with any additives and then adding the pigment preparation and mixing thoroughly.

A whole series of polymers is suitable for the use of the inventive pigment preparation, especially thermo-plastic polymers. The polymers are preferably polar polymers, but it is also possible to use nonpolar (olefinic) polymers in the case of appropriately selected carrier materials. Examples of suitable polymers can be found, for example, in Saechtling, Kunststoff Taschenbuch, 27th Edition, Carl Hanser Verlag.

In addition, the inventive pigment preparation may also find use in paints, coating materials (automotive and industrial coating materials), powder coating materials, printing inks and toners.

It is also possible to use the inventive pigment preparation advantageously for the production of masterbatches. In this way, even the highest demands on the pigment dispersion can be met. The masterbatches can be produced either continuously or batchwise, preferably continuously, for example by using single-screw or twin-screw extruders. In the production of masterbatches, it is advantageous to use powders or chips of the particular polymers. In the case of use of the inventive pigment preparations on a twin-screw extruder, the throughput, according to the conditions, can be enhanced at least by a factor of 2-5 compared to the unprepared pigment. In addition, it is possible using the inventive pigment preparation on a single-screw extruder to produce masterbatches having a pigment content of up to 50% by weight, based on the masterbatch.

Preference is given to using the inventive pigment preparation to produce masterbatches. In the case of appropriate selection of the carrier material, both polar and nonpolar polymers are suitable as the masterbatch base. There are, for example, graft copolymers which can be used as the carrier material in inventive effect pigment preparations either in polar or in nonpolar (olefinic) polymers. For example, ethylene-acrylic acid copolymers are suitable both for use in polar polymers and for use in nonpolar polymers.

The examples which follow are intended to illustrate the invention, but without restricting it.

EXAMPLES

Example 1

297 g of Licowax PE 520 (PE wax powder from Clariant) and 3 g of IRGANOX® 1010 (antioxidant from Ciba Specialty Chemicals) are mixed homogeneously in a tumbling mixer for 0.5 h. Subsequently, 700 g of Iriodin® 100 (pearlescent pigment from Merck KGaA ($TiO_2$-coated mica platelets), are added and the mixture is mixed for a further 0.5 h until a homogeneous premixture is present.

The bulk density of the mixture is determined by filling the mixture into a 250 ml measuring cylinder under ambient pressure and determining the weight of the bed. The bulk density is the ratio of weight/volume and is 290 g/l for the mixture.

A cast iron pan is heated to a surface temperature of 220° C. The complete mixture is introduced into the pan slowly with constant stirring and heated with constant stirring until the wax has become distributed homogeneously on the pearlescent pigment. Subsequently, the homogeneous mixture is introduced into a steel bath and cooled with further stirring.

The pigment preparation obtained does not dust, flows freely and can be processed on a single-screw extruder to masterbatches with up to approx. 50% by weight of pigment, based on the total amount. On a twin-screw extruder, it is possible, with the same pigment content, to enhance the throughput with this preparation at least by a factor of 2-5 (compared to the untreated pigment). The inventive pigment preparation can be incorporated without any problem into all nonpolar (olefinic) polymers known to those skilled in the art.

The bulk density of the pigment preparation obtained is likewise determined by the above-described method and is 470 g/l.

Example 2

A pigment preparation is produced analogously to Example 1, except without addition of the IRGANOX® 1010 antioxidant.

Here, smouldering nests are formed as early as in the course of the cooling operation, which can be prevented only by adding dry ice.

The bulk density of the pigment preparation obtained is 480 g/l by the method described in Example 1; the bulk density of the mixture used is 285 g/l.

Examination of the Self-Heating Behaviour

To test the self-heating behaviour of the preparations according to Examples 1 and 2, test method N.4, described in Chapter 33.3.1.6. of the Recommendations on the Transport of Dangerous Goods, Manual of Tests and Criteria. Tests are carried out in wire baskets with edge lengths of 25 mm and 100 mm at temperatures of 140° C. in order to test whether spontaneous self-ignition or dangerous self-heating takes place. The limiting criterion is a temperature rise by at least 60 K above the oven temperature within 24 h.

Test 1:
Test of the preparation according to Example 1 at 140° C. in a 100 mm wire basket: negative Test 2:
Test of the preparation according to Example 1 at 140° C. in a 25 mm wire basket: negative Test 3:
Test of the preparation according to Example 2 at 140° C. in a 100 mm wire basket: positive Test 4:
Test of the preparation according to Example 2 at 140° C. in a 25 mm wire basket: positive Result:
While the pigment preparation according to Example 2 is classified as a hazardous material of class 4.2, preparation 1 is not classified as a hazardous material under class 4.2.

Example 3

295.5 g of Luwax® AH3 powder (low molecular weight PE wax from BASF) and 4.5 g of Hostanox O10 (phenolic antioxidant from Clariant) are mixed homogeneously in a tumbling mixer for 0.5 h. Subsequently, 700 g of Iriodin® 7205 (interference pigment from Merck KGaA: $TiO_2/SiO_2/TiO_2$-coated mica platelets) are added and the mixture is mixed for a further 0.5 h until a homogeneous premixture is present.

A cast iron pan is heated to a surface temperature of 220° C. The complete mixture is introduced into the pan slowly with constant stirring and heated with constant stirring until the wax has become distributed homogeneously on the interference pigment. Subsequently, the homogeneous mixture is introduced into a steel bath and cooled with further stirring.

The pigment preparation obtained does not dust, flows freely and can be processed on a single-screw extruder to masterbatches with up to approx. 50% by weight of pigment, based on the total amount. On a twin-screw extruder, it is possible, with the same pigment content, to enhance the throughput with this preparation at least by a factor of 2-5 (compared to the untreated pigment). The inventive pigment preparation can be incorporated without any problem into all nonpolar (olefinic) polymers known to those skilled in the art.

Example 4

295.5 g of Luwax® AH3 powder (low molecular weight PE wax from BASF) and 4.5 g of Hostanox O10 (phenolic antioxidant from Clariant) are mixed homogeneously in a tumbling mixer for 0.5 h. Subsequently, 700 g of Iriodin® 305 Solar Gold (gold pigment from Merck KGaA: $Fe_2O_3$- and $TiO_2$- and $SiO_2$-coated multilayer pigment on mica) are added and the mixture is mixed for a further 0.5 h until a homogeneous premixture is present.

A cast iron pan is heated to a surface temperature of 220° C. The complete mixture is introduced into the pan slowly with constant stirring and heated with constant stirring until the wax has become distributed homogeneously on the interference pigment. Subsequently, the homogeneous mixture is introduced into a steel bath and cooled with further stirring.

The pigment preparation obtained does not dust, flows freely and can be processed on a single-screw extruder to masterbatches with up to approx. 50% by weight of pigment, based on the total amount. On a twin-screw extruder, it is possible, with the same pigment content, to enhance the throughput with this preparation at least by a factor of 2-5 (compared to the untreated pigment). The inventive pigment preparation can be incorporated without any problem into all nonpolar (olefinic) polymers known to those skilled in the art.

Example 5

295.5 g of Luwax® AH3 powder (low molecular weight PE wax from BASF) and 4.5 g of Hostanox O10 (phenolic antioxidant from Clariant) are mixed homogeneously in a tumbling mixer for 0.5 h. Subsequently, 700 g of Miraval 5311 Scenic White from Merck KGaA ($SiO_2$- and $TiO_2$-coated glass platelets) are added and the mixture is mixed for a further 0.5 h until a homogeneous premixture is present.

A cast iron pan is heated to a surface temperature of 220° C. The complete mixture is introduced into the pan slowly with constant stirring and heated with constant stirring until the wax has become distributed homogeneously on the interference pigment. Subsequently, the homogeneous mixture is introduced into a steel bath and cooled with further stirring.

The pigment preparation obtained does not dust, flows freely and can be processed on a single-screw extruder to masterbatches with up to approx. 50% by weight of pigment, based on the total amount. On a twin-screw extruder, it is possible, with the same pigment content, to enhance the throughput with this preparation at least by a factor of 2-5 (compared to the untreated pigment). The inventive pigment preparation can be incorporated without any problem into all nonpolar (olefinic) polymers known to those skilled in the art.

Example 6

295.5 g of Luwax® AH3 powder (low molecular weight PE wax from BASF) and 4.5 g of Hostanox O10 (phenolic antioxidant from Clariant) are mixed homogeneously in a tumbling mixer for 0.5 h. Subsequently, 700 g of Colorstream Autumn Mystery (colour flop pigment from Merck KGaA: $Fe_2O_3$-coated $SiO_2$ platelets) are added and the mixture is mixed for a further 0.5 h until a homogeneous premixture is present.

A cast iron pan is heated to a surface temperature of 220° C. The complete mixture is introduced into the pan slowly with constant stirring and heated with constant stirring until the wax has become distributed homogeneously on the interference pigment. Subsequently, the homogeneous mixture is introduced into a steel bath and cooled with further stirring.

The pigment preparation obtained does not dust, flows freely and can be processed on a single-screw extruder to masterbatches with up to approx. 50% by weight of pigment, based on the total amount. On a twin-screw extruder, it is possible, with the same pigment content, to enhance the throughput with this preparation at least by a factor of 2-5 (compared to the untreated pigment). The inventive pigment preparation can be incorporated without any problem into all nonpolar (olefinic) polymers known to those skilled in the art.

The invention claimed is:

1. A pigment preparation, consisting of one or more effect pigments in platelet form that is a pearlescent pigment, an interference pigment, a metal effect pigment, a multilayer pigment with transparent, semitransparent and/or opaque layers, a holographic pigment, a BiOCl pigment and/or a LCP pigment; a wax having a molecular weight of 500-20,000 or wax mixture thereof, at least one antioxidant that is
   a lactone/phosphite mixture
   a lactone/phosphite/phenol mixture
   a phenol/phosphite mixture
   a phosphite or
   a phenol,
     and optionally one or more additives that are lubricants, release agents, stabilizers, antistats, flame retardants, flexibilizers, plasticizers, adhesion promoters, blowing agents, antioxidants, UV adsorbers, organic polymer-compatible solvents and/or surfactants, phenol derivatives, mineral oils, inorganic fillers, dyes and/or color pigments, wherein the effect pigment is present in an amount of 55-80% by weight, based on the pigment preparation.

2. The pigment preparation according to claim 1, wherein the pigment preparation has a wax content of 20-45% by weight based on the overall preparation.

3. The pigment preparation according to claim 1, wherein the wax or wax mixture is natural wax, modified natural wax, partly synthetic wax, fully synthetic wax, amide wax, chlorinated or fluorinated polyolefin wax.

4. The pigment preparation according to claim 1, wherein the wax is a fully synthetic wax.

5. The pigment preparation according to claim 1, wherein the wax is a nonoxidized or partly oxidized polyolefin wax.

6. The pigment preparation according to claim 1, wherein the wax is a polyethylene wax or a polypropylene wax.

7. The pigment preparation according to claim 1, wherein the wax or wax mixture has a melting range of 70-200° C., determined by DIN 51007.

8. The pigment preparation according to claim 1, wherein the proportion of the effect pigment, based on the pigment preparation, is 65-75% by weight.

9. The pigment preparation according to claim 1, wherein the proportion of antioxidant is 0.01-5% by weight based on the wax used.

10. The pigment preparation according to claim 1, wherein the pigment preparation additives are lubricants, release agents, stabilizers, antistats, flame retardants, flexibilizers, plasticizers, adhesion promoters, blowing agents, antioxidants, UV adsorbers, organic polymer-compatible solvents and/or surfactants, phenol derivatives, or mineral oils.

11. The pigment preparation according to claim 1, wherein the antioxidant is at least one of
   tetrakis[methylene-3-(3,5-di-tert-butyl-4-hydroxyphenyl-propionate)]methane
   n-octadecyl β-(4-hydroxy-3,5-di-tert-butylphenyl)propionate
   N,N'-bis(3,5-dibutyl-4-hydroxyphenylpropionyl)hydrazine
   N,N'-hexane-1,6-diylbis[3-(3,5-di-tert-butyl-4-hydroxyphenyl)propionamide]
   tris(3,5-di-tert-butyl-4-hydroxybenzyl)isocyanurate
   tri(2,4-di-tert-butylphenyl)phosphite
   bis(2,4-di-t-butylphenyl)pentaerythritol diphosphite
   triphenyl phosphite
   trisnonylphenyl phosphite
   diphenyl isodecyl phosphite
   diisodecyl phenyl phosphate
   diisooctyl phenyl phosphite
   diphenyl isooctyl phosphate
   phosphoric acid alkyl/aryl esters
   bisphenol A phosphite
   dilauryl thiodipropionate distearyl thiodipropionate
butyl- and octyldiphenylamine
dinonyldiphenylamine
4,4'-bis(alpha,alpha-dimethylbenzyl)diphenylamine
4,4'-dioctyldiphenylamine
mixture of tetrakis[methylene-3-(3,5-di-tert-butyl-4-hydroxyphenylpropionate)]methane and tri(2,4-di-tert-butylphenyl)phosphite (weight ratio 1:1)
mixture of tetrakis[methylene-3-(3,5-di-tert-butyl-4-hydroxyphenylpropionate)]methane and tri(2,4-di-tert-butylphenyl)phosphite (weight ratio 1:2)
mixture of tetrakis[methylene-3-(3,5-di-tert-butyl-4-hydroxyphenylpropionate)]methane and tri(2,4-di-tert-butylphenyl)phosphite (weight ratio 1:3)
mixture of tetrakis[methylene-3-(3,5-di-tert-butyl-4-hydroxyphenylpropionate)]methane and tri(2,4-di-tert-butylphenyl)phosphite (weight ratio 1:4) or
mixture of n-octadecyl β-(4-hydroxy-3,5-di-tert-butylphenyl)propionate and tri(2,4-di-tert-butylphenyl)phosphite.

12. A process for producing a pigment preparation according to claim 1, comprising mixing one or more effect pigments in platelet form and at least one antioxidant with a wax or wax mixture under the influence of heat.

13. Paints, coating materials, powder coating materials, printing inks, polymers, toners or masterbatches, comprising a pigment preparation according to claim 1.

* * * * *